July 8, 1930.  F. E. BENNETT  1,770,192
REGULATING VALVE
Filed April 9, 1927
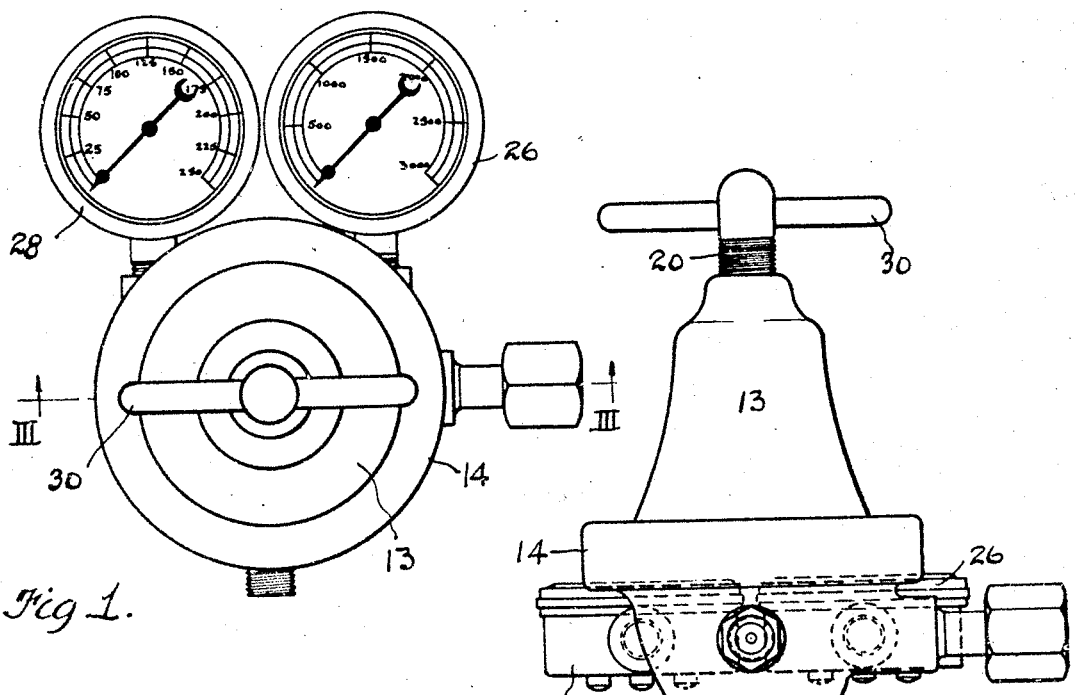
Fig. 1.
Fig. 2.
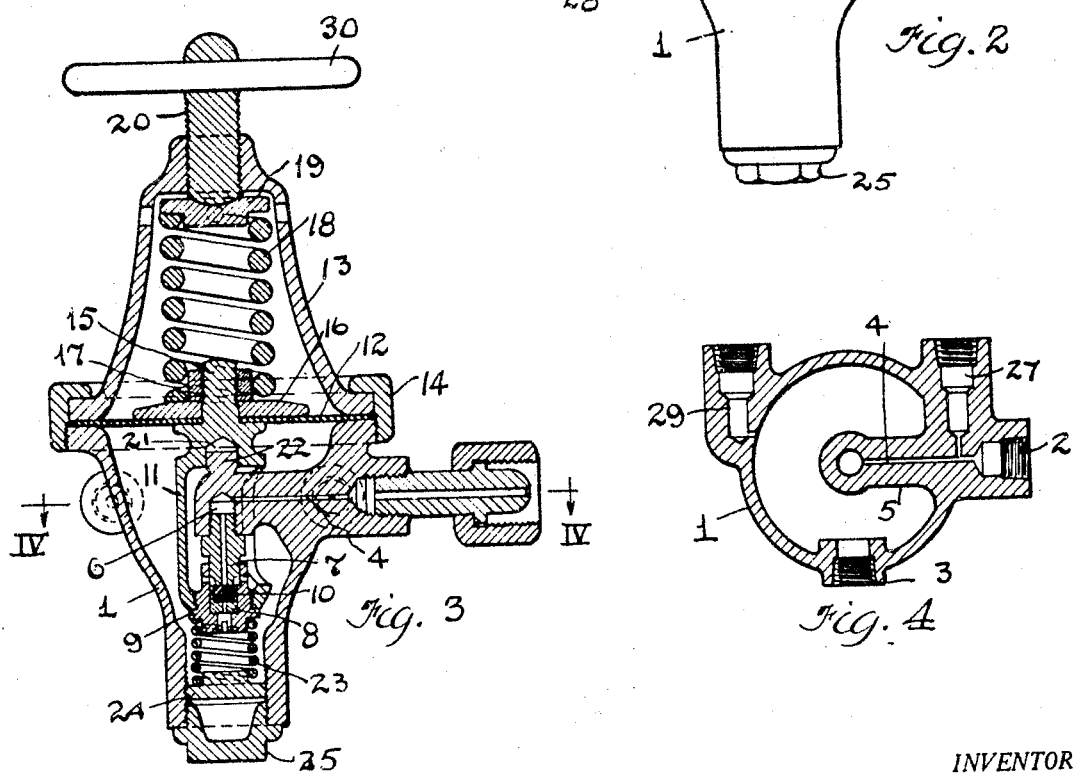
Fig. 3.
Fig. 4.
INVENTOR.
Frederick E. Bennett
BY
Fay Oberlin & Fay
ATTORNEYS.

Patented July 8, 1930

1,770,192

UNITED STATES PATENT OFFICE

FREDERICK E. BENNETT, OF SHAKER HEIGHTS, OHIO, ASSIGNOR TO THE NATIONAL WELDERS MFG. & SUPPLY COMPANY, OF CLEVELAND, OHIO, A CORPORATION OF OHIO

REGULATING VALVE

Application filed April 9, 1927. Serial No. 182,316.

This invention relates to valves, and more particularly valves adapted to regulate the release and supply of fluids under pressure. It is among the objects of the invention to provide a construction facilitating accurate assemblage of the working parts, and furthermore maintaining accuracy of seating, and durability. Other objects and advantages will appear as the description proceeds.

To the accomplishment of the foregoing and related ends, the invention, then, consists of the features hereinafter fully described, and particularly pointed out in the claims, the following description and the annexed drawing setting forth in detail an illustrative embodiment of the invention, such embodiment being but one of the various forms in which the principle of the invention may be applied.

In said annexed drawing:—

Fig. 1 is a front elevational view of an embodiment of the invention; Fig. 2 is an inverse plan view; Fig. 3 is a longitudinal medial section; and Fig. 4 is a section taken on a plane indicated by the line IV—IV, Fig. 3.

Referring more particularly to the drawing, the reference numeral 1 designates a housing tapped as at 2 and 3 for connection to a source of fluid under pressure, for instance a cylinder of compressed gas, and a line to a point of usage, respectively. The inlet bore 4 lies in an internally projecting stem 5 integral with the housing. At its free end, the stem presents an enlarged tapped outlet 6 within which is screw threaded a valve member, such as nozzle 7. Coacting with the valve member 7 is another member 8, as a valve seat, and this advantageously is carried in a bushing 9 and preferably has a facing or insert 10. Desirably the insert may be of a resistant composition, advantageously a phenol-formaldehyde condensation product reenforced with fiber, such as fabric. The bushing 9 is mounted in a yoke 11, and as such yoke requires a sufficient latitude of movement to permit of the opening and closing requirements of the valve members, the invention contemplates means for maintaining the alignment of the assemblage irrespective of such movements. The yoke is attached to a diaphragm 12 which may be of metal, but which preferably is of rubber or rubberized fabric, and which is located at the end of the housing member 1, conveniently being clamped thereagainst by a casing member 13, a clamping ring 14 engaging the flanges of the housing and the casing members, and being held by screw threads, as on the flange of the housing 1. The projection 15 from the yoke 11 extends through the diaphragm 12 and is provided with a washer member 16 and a nut 17. Seated about the nut and on the washer is a spring 18, the opposite end of which engages a bearing-plate 19, and a screw threaded spindle 20 coacts therewith. As preferred aligning means at the diaphragm end of the yoke, a guideway 21 therein is arranged to receive a spud 22 on the stem 5. The yoke at the end remote from the diaphragm is also aligned, and resiliently backed up by adjustable closure-spring 23 which engages about bushing 9 and an adjustable bearing-plate 24 having screw threaded engagement with the casing. The closure plug 25 serves to further protect the contained members.

A gauge or gauges suitably placed, allow of ready check on the pressures, and by tapping in one gauge 26 in a bore 27 communicating with the bore 4, that is, on the tank side of the valve, the pressure within the tank to which the device is applied may be readily indicated. A gauge 28 tapped into a bore 29 communicating with the interior of the housing 1 may then serve to indicate the pressure beyond the valve and available in the line to the welding tip, or whatever device the valve is being used with. If desired, the high pressure gauge 26 may be omitted, and the working pressure gauge 28 may alone be used; in such case instead of having two taps 27 and 29, only the tap 29 would be necessary, and this may then be arranged symmetrically with the outlet 3 if preferred.

The manner of use of the device will be clear from the foregoing. Being attached to a tank of compressed gas for instance, the valve is opened up by turning the handle 30 slightly to push the yoke 11 and bushing 9 with valve seat 10 away from the fixed valve nozzle 7 to an extent required for the working pressure desired, as indicated by the gauge 28. The flow may thus be set and controlled and finally shut off by reverse movement, as desired.

It will thus be seen that alignment is maintained by adequate guide means at each end axially of the working parts, the small excursion of movement necessary being amply provided for, and at the same time a resilient backing for the movable valve member in the closing direction is had in the spring 23, and predetermined adjustment of this may be accomplished as desired.

Other modes of applying the principle of the invention may be employed, change being made as regards the details disclosed, provided the means stated in any of the following claims, or the equivalent of such, be employed.

I therefore particularly point out and distinctly claim as my invention:—

1. A device of the character described, which comprises a housing, a diaphragm therein, a yoke rigidly connected at one end to said diaphragm, a fixed guide near the diaphragm end of said yoke preventing lateral thrust on the diaphragm, a spring backing said diaphragm, a valve seat carried by the other end of said yoke, and a bored stem projecting into the housing having a valve nozzle directed toward said valve seat.

2. A device of the character described, which comprises a housing, a diaphragm therein, a yoke rigidly connected at one end to said diaphragm, a fixed guide near the diaphragm end of said yoke preventing lateral thrust on the diaphragm, a spring backing said diaphragm, a valve seat carried by the other end of said yoke, an inlet duct having a valve nozzle directed toward said valve seat, and means urging the valve seat toward the valve nozzle with allowance of lateral deviation.

3. A device of the character described, which comprises a housing, a diaphragm therein, a yoke secured at one end to said diaphragm, a spring backing said diaphragm, a valve seat carried by the other end of said yoke, an inlet duct having a valve nozzle directed toward said valve seat, said valve seat having a facing of slightly resilient phenol-formaldehyde condensation product, and means urging said valve seat against the valve nozzle.

Signed by me this 8th day of April, 1927.

FREDERICK E. BENNETT.